United States Patent [19]

Fisher

[11] Patent Number: 5,696,736

[45] Date of Patent: Dec. 9, 1997

[54] HYDROPHONE FOR DETERMINING DIRECTION OF UNDERWATER SOUND

[75] Inventor: Stanley A. Fisher, Boyds, Md.

[73] Assignee: The United States of America as represented by the Secretary of the Navy, Washington, D.C.

[21] Appl. No.: 758,044

[22] Filed: Nov. 27, 1996

[51] Int. Cl.$^6$ ............................................. G01S 3/80
[52] U.S. Cl. ......................................... 367/124; 367/902
[58] Field of Search ........................ 367/118, 124, 367/129, 127, 131, 902, 188, 165, 173, 123, 910

[56] References Cited

U.S. PATENT DOCUMENTS

| | | | |
|---|---|---|---|
| 3,174,129 | 3/1965 | Laughlin et al. | 340/5 |
| 3,715,577 | 2/1973 | Bohman | 367/124 |
| 3,986,161 | 10/1976 | MacKellar | 340/6 |
| 4,363,114 | 12/1982 | Bucaro et al. | 367/149 |
| 5,136,555 | 8/1992 | Gardos | 367/132 |
| 5,140,559 | 8/1992 | Fisher | 367/149 |
| 5,155,707 | 10/1992 | Fisher | 367/149 |
| 5,570,324 | 10/1996 | Geil | 367/124 |

*Primary Examiner*—Daniel T. Pihulic
*Attorney, Agent, or Firm*—John Forrest; Jacob Shuster; Gary Borda

[57] ABSTRACT

The invention is directed to an improved acoustic sensor system for determining the direction of underwater sound signals relative to a user is disclosed. The sensor system includes first and second sensing means for sensing incoming acoustic energy and for providing first and second acoustic energy signals in response thereto; separation means for separating the first and second sensing means a distance $S=E(C_W/C_A)$ where E is substantially equal to the separation distance between the users ears, $C_W$ is the speed of sound in water, and $C_A$ is the speed of sound in air; detector means, operatively connected with the first and second sensing means, for providing first and second output signals in response to the first and second acoustic energy signals; and audio means, operatively connected with the detector means, for providing an audio output to the user in response to the first and second output signals.

5 Claims, 2 Drawing Sheets

HYDROPHONE FOR DETERMINING DIRECTION OF UNDERWATER SOUND

STATEMENT OF GOVERNMENT RIGHTS

The invention described herein may be manufactured and used by or for the Government of the United States of America for governmental purposes without the payment of any royalties thereon or therefor.

CROSS REFERENCE TO RELATED APPLICATIONS

This application is related to co-owned and co-pending application Ser. No. 08/703,276, filed Aug. 26, 1996, incorporated herein by reference, and the following co-owned patents: U.S. Pat. No. 5,140,559 issued Aug. 18, 1992, and U.S. Pat. No. 5,155,707 issued Oct. 13, 1992, both patents incorporated herein by reference.

BACKGROUND OF THE INVENTION

1. Field of Invention

The present invention relates generally to devices for detecting sound beneath the surface of a body of water and, more particularly, to a hydrophone device and configuration that allows a user to determine the direction of the underwater sound source relative to the user.

2. Brief Description of Related Art

The human brain has developed the ability to interpret sound direction in air based on the time delay between sound reaching the left and right ears. Therefore, a listener, subjected to acoustic energy in air, not only detects the presence of sound but intuitively identifies the direction from which the sound originates. The time delay is a function of the distance between the ears, the incoming angle of the sound, and the speed of sound in air, i.e., $T_D=(E/C_A)\sin\theta$, where $T_D$ is the time delay between sound reaching the right and left ears, E is the separation distance between the hearer's ears, $C_A$ is the speed of sound in air, and $\theta$ is the angle of the incoming sound relative to the hearer measured from directly ahead of the hearer. Based on the time delay, the hearer intuitively identifies the angular direction from which the sound originates.

However, although a hearer can detect sound underwater, because the speed of sound is greater in water (about 5000 feet per second) than in air (about 1100 feet per second), the time delay is less in water than in air. Thus, the brain misinterprets the angular location of the sound relative to the hearer. For example, if the distance between right and left ears is 0.5 feet, the time delay in air from a sound coming from the hearer's right, i.e., 90 degrees from straight ahead, is about 455 milliseconds. However, in water, the time delay from a sound originating from the diver's right is about 100 milliseconds. This is the same time delay experience in air for a sound originating at about 13 degrees from straight ahead. Because a right hand sound source results in the maximum between ear time delay, the maximum perceived angle underwater is about 13 degrees. Consequently, a diver operating underwater perceives all sound as originating in a narrow band (in this example about ±13 degrees) from straight ahead or straight behind.

Prior art methods of determining the direction of an underwater noise source include training a narrow acoustic beam in different directions, and alternatively, moving a single sensor relative to a source to determine homogeneity and thus infer direction. Directional capability such as the former have only been provided at considerable expense, weight and complexity, most often requiring a large vehicle with the listener inside.

Thus, there is a need for a simple, lightweight, inexpensive device that provides divers or underwater users with a means to determine the true direction from which the perceived underwater sound originates.

SUMMARY OF THE INVENTION

Accordingly, it is an object of the present invention to provide a means whereby a diver or underwater user may both perceive sound and locate the direction from which the sound originates.

It is a further object of the present invention to provide a means by which a diver or underwater user may intuitively determine the direction of an underwater sound source using the same physiological aural processing as used in air.

Other objects and advantages of the present invention will become apparent to those skilled in the art upon a reading of the detailed description hereinafter taken in conjunction with the drawings for support of the claims.

In accordance with the present invention, an improved acoustic sensor system for determining the direction of underwater sound signals relative to a user is provided. The sensor system includes first and second sensing means for sensing incoming acoustic energy and for providing first and second acoustic energy signals in response thereto; separation means for separating the first and second sensing means a distance $S=E(C_W/C_A)$ where E is substantially equal to the separation distance between the users ears, $C_W$ is the speed of sound in water, and $C_A$ is the speed of sound in air; detector means, operatively connected with the first and second sensing means, for providing first and second output signals in response to the first and second acoustic energy signals; and audio means, operatively connected with the detector means, for providing an audio output to the user in response to the first and second output signals. The improved sensor system alters the time delay between sound reaching the user's right and left ears such that the resulting time delay is substantially equal to the time delay in air. Consequently, the user may correctly identify the direction of the underwater sound using his or her aural processing evolved in an air environment.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
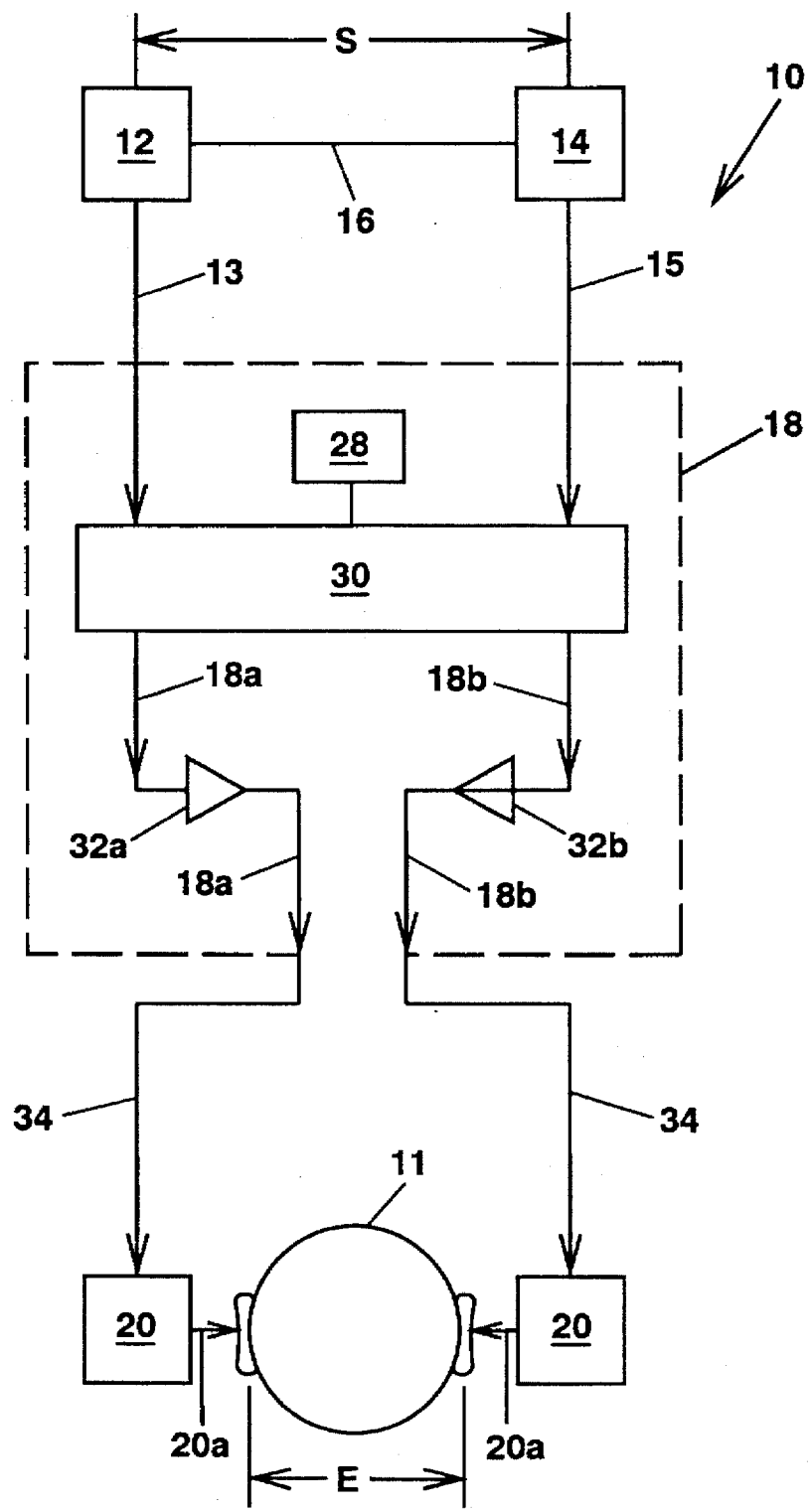
FIG. 1. is a schematic representation of the acoustic sensor of the present invention.

The present invention comprises an acoustic sensor for determining the direction of underwater acoustic signals relative to a user by physiologically matching the actual underwater sound field to a diver's or underwater user's auditory system so that the acoustic signal "sounds" like it originates from its actual location. Referring now to the drawings, and particularly to FIG. 1, a schematic representation of the acoustic sensor of the present invention, designated generally as item 10, is shown. Acoustic sensor 10 provides a means of detecting acoustic signals and a means by which a symbolically represented user 11 may determine the direction of origin of the acoustic signals relative to his or her position.

Figure 2:
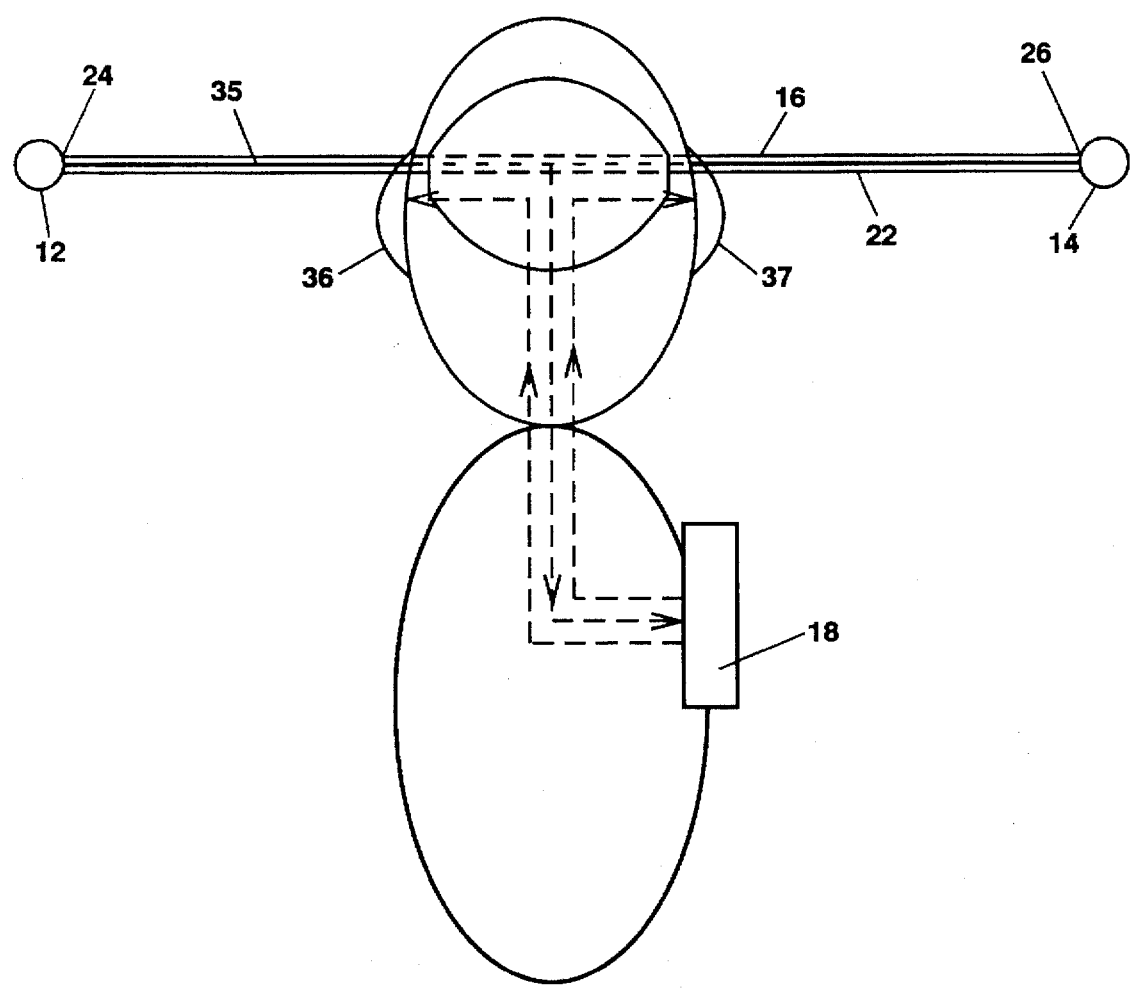
FIG. 2. is a front view representing a user equipped with one embodiment of the present invention.

The major components of sensor 10, as shown in FIGS. 1 and 2, include: (a) first sensing means 12 for sensing incoming acoustic energy and for providing first acoustic energy signal 13 in response thereto; (b) second sensing means 14 for sensing incoming acoustic energy and for providing second acoustic energy signal 15 in response thereto; (c) separation means 16 for separating the centers of sensitivity of first and second sensing means, 12 and 14, a distance $S=E(C_W/C_A)$ where E is substantially equal to the separation distance between the user's ears, $C_W$ is the speed of sound in water, and $C_A$ is the speed of sound in air; (d) detector means 18, operatively connected with first and second sensing means, 12 and 14, for providing first output signal 18a in response to first acoustic energy signal 13 and second output signal 18b in response to second acoustic energy signal 15; and (e) audio means 20, operatively connected with detector means 18, for providing an audio output to user 11 in response to first and second output signals, 18a and 18b.

First and second sensing means, 12 and 14, may be any of the well known hydrophones presently available for sensing underwater sound, such as ceramic or piezoelectric hydrophones. However, to provide a full 360 degree range of "hearing", it is preferred that first and second sensing means, 12 and 14, be omni-directional hydrophones. The omni-directional hydrophones may take the form of spherical hydrophones capable of receiving and sensing acoustic energy originating from any direction. Thus, first and second sensing means, 12 and 14, may each be comprised of one or more fiber-optic cables coiled or wrapped to produce a spheroid shaped omni-directional fiber-optic hydrophone. Preferably, first and second sensing means, 12 and 14, are vibration-canceling omni-directional hydrophones as disclosed in co-owned U.S. Pat. No. 5,155,707, issued Oct. 13, 1992, to the present inventor, assigned to the United States of America as represented by the Secretary of the Navy, and incorporated herein by reference.

First and second sensing means, 12 and 14, may each include a sensing cable for providing an acoustic signal to detector means 18 and, optionally, a reference cable that does not respond to acoustic energy for providing a reference signal to detector means 18. Each reference cable may be mounted remote from its corresponding sensing cable, for example, within detector means 18. However, for better common mode rejection and to cancel induced noise resulting from vibration, movement or deformation of sensor 10 or from thermal or electromagnetic radiation interference, each reference cable may be mounted in a parallel paired arrangement with its corresponding sensing cable. In either case, both the sensing cables and reference cables are further encased in acoustically transparent material.

Separation means 16 must be capable of maintaining first and second sensing means, 12 and 14, a fixed distance S apart from each other and oriented such that a line connecting first and second separation means is substantially parallel to, and preferably substantially collinear with, a line connecting the user's ears. The distance S is predetermined, as hereinafter described, and may be adjusted for a particular user. Thus, in one preferred embodiment, separation means 16 is adjustable (e.g., adjustable in length) such that the distance S may be adjusted for different users. Separation means 16 as shown in FIG. 2 may comprise rod 22 mounted for movement with the user wherein first and second sensing means, 12 and 14, are mounted at first and second ends, 24 and 26, respectively, of rod 22. Rod 22 should be stiff enough to withstand an approximately 5 knot flow without bending. Rod 22 may optionally include a central swivel to allow rod 22 to fold across the user's back to reduce drag in flows above about 5 knots. Rod 22 should be made of a strong, yet flexible, material such as graphite or fiber reinforced composite materials. Rod 22 may be mounted, at the proper alignment, to the user's head, for example by way of a diving mask or head gear. Alternatively, rod 22 may be mounted, at the proper alignment, on other parts of the user's equipment, for example, to tanks or to a separate harness. The important point is to properly align and separate first and second sensing means, 12 and 14, as described above, and the particular method of mounting sensor 10 for underwater use should not be considered a limitation of the invention. For example, separation means 16 and sensing means, 12 and 14, could be mounted on a diver piloted vehicle or a remotely piloted vehicle, providing the user with the sensation of hearing the acoustic field around the vehicle.

Detector means 18 preferably includes self contained power supply 28 (e.g., nicad rechargeable batteries), processing means 30 for processing first acoustic energy signal 13 and providing first output signal 18a in response thereto and for processing second acoustic energy signal 15 and providing second output signal 18b in response thereto, and at least two amplifiers 32a and 32b for amplifying first and second output signals, 18a and 18b. Thus, all the electronics are collocated in detector means 18 which may be enclosed in a compact, watertight pack for attachment to user 11, preferably at the side or back of user 11. Detector means 18 is operatively connected with audio means 20 by transmitting means 34 for transmitting first and second output signals, 18a and 18b, to audio means 20. Transmitting means 34 may be, for example, electric cables for transmitting a voltage from detector means 18 to audio means 20.

Alternatively, first and second sensing means, 12 and 14, may each take the form of one or more piezoelectric polymer cables, e.g., polyvinylidene fluoride (PVDF) cables, coiled or wrapped to produce a spheroid shaped piezoelectric omni-directional hydrophone. PVDF converts acoustic pressure directly into voltage which can be measured across the ends of the PVDF spherical piezoelectric hydrophone by suitable detector means 18 well known in the art and transmitted directly to audio means 20. Thus, in this case, processing means 30 is not required.

Rod 22 may be hollow to contain therein means 35 for transmitting first and second acoustic energy signals, 13 and 15, to detector means 18. Means 35 may be, for example, electric cables for transmitting a voltage from piezoelectric hydrophones, 12 and 14, to suitable detector means 18, or optical fibers for transmitting light from fiber-optic hydrophones, 12 and 14, to suitable processing means 30.

The audio output provided by audio means 20 includes first audio signal 20a corresponding to acoustic energy sensed by first sensing means 12 and second audio signal 20b corresponding to acoustic energy sensed by second sensing means 14. Therefore, audio means 20 preferably comprises first speaker 36 for providing first audio signal 20a to a user's first ear and second speaker 37 for providing second audio signal 20b to a user's second ear. First speaker 36 is operatively connected to first amplifier 32a by way of transmitting means 34 (e.g., a first speaker wire) while second speaker 37 is operatively connected to second amplifier 32b by way of transmitting means 34 (e.g., a second speaker wire). Each speaker, 36 and 37, may be equipped with a cutoff to disengage the speaker from amplifiers, 32a and 32b, above a set decibel level to avoid damage to the user's ears. The speakers may be separate units, such as waterproof earphones sealed around the user's ears with a viscous material (e.g., petroleum jelly), or may be incorporated into a diving mask or headgear. By using sealed earphones there is an air path between the user's inner ears and first and second speakers, 36 and 37. This air path (or air pocket) provides a baffle against the unwanted direct path of waterborne noise through the water directly to the user's ears.

As previously indicated, the time delay in air is:

$$T_D(\text{air}) = (E/C_A)\sin\theta;$$

while the time delay in water is:

$$T_D(\text{water}) = (E/C_W)\sin\theta.$$

However, when using the present invention in water, the separation distance E experience by user 11 is equal to the separation distance S between first and second sensing means, 12 and 14, thus the time delay in water is:

$$T_D(\text{water}) = (S/C_W)\sin\theta, \text{ where}$$

$$S = E(C_W/C_A), \text{ thus}$$

$$T_D(\text{water}) = [E(C_W/C_A)]/C_W)\sin\theta$$
$$= (E/C_A)\sin\theta = T_D(\text{air}).$$

Accordingly, the present invention modifies the time delay experienced by user 11 such that the resulting time delay in water is substantially equal to the time delay in air.

Because acoustic sensor 10 senses, processes, and transmits acoustic signals almost instantaneously, first and second audio signals, 20a and 20b, (sensed by first and second sensing means, 12 and 14, respectively) are provided to user 11 with a time delay (based on separation distance S) equivalent to the time delay user 11 would experience in air. Consequently, user 11 can process the audio signals to determine their true direction of origin.

Figure 3:
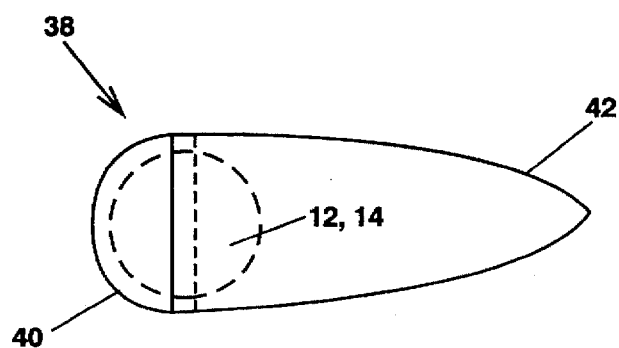
FIG. 3. is a side view showing a spherical hydrophone equipped with a flow noise filter in accordance with the present invention.

As divers move through the water, or remain at rest in a current, they experience an interference noise created by "rushing water". To alleviate this problem, the present invention may incorporate flow noise filter 38. Generally the flow noise filter 38 includes one filtering means encasing each of first and second sensing means, 12 and 14. As shown in FIG. 3, each filter 38 includes noise reducing dome 40 enclosing a forward facing portion of first or second sensing means, 12 or 14, and aftwardly extending acoustic baffle 42 enclosing a backward facing portion of first or second sensing means, 12 or 14. Noise reducing dome 40 and acoustic baffle 42 are connected to encase the corresponding sensing means, 12 or 14. Baffle 42 may be made out of high acoustic impedance material such as a closed cell foam. Dome 40 is preferably a hemispherical dome made of an acoustically transparent material such as neoprene rubber (e.g., BC-562 neoprene) and preferably has a smooth surface (e.g., a surface finish having 120 microinch or less of roughness). Dome 40 acts as a low wavenumber acoustic filter, allowing desirable low wavenumber acoustic energy to pass, while filtering out unwanted high wavenumber turbulent boundary layer flow energy. As a result, user 11 hears only environmental sound without the "swish of rushing water over the ears."

The aft diameter of dome 40 and the forward diameter of acoustic baffle 42 are equal, creating a smooth seam between forward facing dome 40 and aft facing acoustic baffle 42. Acoustic baffle 42 has an elongated surface that tapers in the aftward direction. Beginning at the point where dome 40 and acoustic baffle 42 meet, acoustic baffle 42 tapers aft. Acoustic baffle 42 has a substantially conical shape with a continuously decreasing circular or elliptical cross-section as it tapers aft. Acoustic baffle 42 may have a curved-walled or straight-walled taper. The preferred taper ratio is about 6 to 1. Acoustic baffle 42 is preferably made of air voided polyurethane material. Acoustic baffle 42 allows the user to filter out unwanted noise coming from the direction of acoustic baffle 42. By changing his or her position (e.g., by turning his or her head) to place unwanted noise behind sensing means, 12 and 14, (i.e., in the direction of acoustic baffle 42), the user minimizes the unwanted noise and enhances the ability to hear sounds originating from other directions. It is often difficult for a diver to discriminate between sounds originating from a narrow range directly in front and sounds originating from a narrow range directly behind the diver. Acoustic baffle 42 solves this problem by allowing the diver to turn his or her head to determine direction of origin based on loudness, as would be done in air. Alternatively, if true omni-directional hearing is desired, acoustic baffle 42 may be made of acoustically transparent neoprene to provide flow noise reduction without acoustic baffling.

In a preferred embodiment, sensor 10 corresponds to the sensor disclosed in U.S. Pat. No. 5,155,707. First and second sensing means, 12 and 14, are omni-directional, fiber-optic hydrophones (as also disclosed in U.S. Pat. No. 5,155,707) each having sensing and reference cables formed in a spherical configuration which is encased in an acoustically transparent elastomer material. The preferred elastomer material is polyurethane, e.g., uralite. However, any compliant and acoustically transparent material may be used. Each reference cable is also formed in a spherical configuration in the same elastomer material and is further arranged in a paired arrangement with its corresponding sensing cable. This pattern allows the sensing and reference cables to be adjacently located at all points along the spherical winding. Because both cables lie in approximately the same location both are subject to the same vibrational inputs. By thus locating the cables in paired windings, signals caused by vibration or deformation of sensing means 12 and 14 are sensed equally by both the sensing and reference cables.

In this embodiment, each sensing cable includes a light transmitting glass/silicone optical fiber core encased within an acoustically sensitive jacket and a soft silicone buffer layer surrounding the optical fiber core between the optical fiber core and the acoustically sensitive jacket. The buffer layer, which prevents microbending of the optical fiber core, thus, preventing resulting acoustic signal loss, is bonded to both the optical fiber core and the acoustically sensitive jacket. Consequently, the acoustically sensitive jacket is bonded to optical fiber core. Each reference cable, on the other hand, includes a light transmitting optical fiber core encased within a protective jacket and a soft silicone buffer layer surrounding the optical fiber core between the optical fiber core and the protective jacket such that the protective jacket is not bonded to the optical fiber core. The preferred materials of both the acoustically sensitive jacket and the protective jacket is polyester, e.g., HYTREL® manufactured by DuPont. Sensor 10 further includes a coherent light source for providing light to the sensing cables and the reference cables. The coherent light source may be any available source providing coherent light, but is preferably a standard fiber-optic laser light source.

By bonding the three layers of the sensing cable together, each sensing cable is made highly sensitive to acoustic energy. Consequently, the optical fiber core of each sensing cable deforms as a result of pressure fluctuation induced by impinging acoustic energy. The pressure induced strain within each optical fiber core causes changes in both the index of refraction of the core and the length of the optical fiber. The result is a change in the optical path length of light travelling through each sensing cable. In contrast, the reference cable, without bonding between the protective jacket and the optical fiber core, is far less sensitive to acoustic energy and, therefore, is insulated from impinging acoustic energy waves. Consequently, the unbonded jacket of each reference cable does not effectively transmit the acoustic energy induced deformation to the underlying acoustically sensitive optical fiber core. As a result, the optical path length of light traveling through each reference cable is not affected by impinging acoustic energy.

The resulting acoustic energy induced difference in optical path lengths between the sensing and reference cables induces a difference in the phase shift between light traveling through the two cables. This phase shift difference is detected by processing means 30.

In contrast, all sensing and reference cables are affected equally by vibrational inputs and, therefore, the light traveling through the two cables experience identical phase shifts due to vibration. Since there is no phase difference between the two cables as a result of vibration, the phase difference of the light traveling through each sensing cable and its corresponding reference cable is directly related to the impinging acoustic energy level. Alternatively, the reference cables may be separated from the sensing cable and located such that it does not respond to acoustic energy, e.g., a fiber optic cable wound around a steel mandril.

For this preferred embodiment (i.e., omni-directional, fiber-optic hydrophones), processing means 30 may be a combination of any of a variety of well known photodetectors and demodulators available in the art, and disclosed in co-owned and co-pending application Ser. No. 08/703,276, and co-owned U.S. Pat. Nos. 5,140,559 and 5,155,707, and preferably takes the form of an electro-optical processor such as a Mach Zehnder interferometer system. The electro-optical processor is connected to and receives transmitted light from sensing and reference cables of first and second sensing means, 12 and 14, and is suitable for determining differences in induced phase shift between transmitted light from the sensing and reference cables, and converting the acoustic generated phase shift (interference pattern) into an amplitude dependent voltage signal. A preferred electro-optic processor employs a synthetic heterodyne demodulation technique for interrogating the phase modulated signal. One such synthetic heterodyne demodulation technique is disclosed in U.S. Pat. No. 4,363,114, herein incorporated by reference. Other suitable demodulation techniques may be employed, e.g., homodyne demodulation. Preferably, the processor includes a photo-voltage converter, an optical phase detector and a pre-amplifier.

The advantages of the present invention are numerous. Because the user receives sound which is compensated for the difference between the speed of sound in water and in air, the present invention provides the ability to locate noise sources underwater using the same physiological aural processing as used in air rather than accomplishing this with expensive and complicated sonar signal processors. The present invention allows the user to hear and accurately interpret acoustic signals, even while swimming, with a minimum of equipment complexity, weight, drag and expense. Thus, the present invention may provide a critical capability in many underwater situations, such as communicating with and locating other divers, locating and tracking underwater biological sources, locating leaks in pipelines or malfunctioning machinery, and maintaining orientation with respect to known sound sources (objects or other divers) in cloudy water. The present invention could provide for the user's safety by allowing the user to detect and locate dangerous sound sources, e.g., when working with large equipment, when working near underwater animals, and when trying to avoid falling objects.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. In combination, a pair of underwater hydrophones; audio output means for enabling aural perception of sound; detector means operatively connecting said hydrophones to the audio output means for identification of travel direction of said sound from signals generated by the hydrophones in response to acoustic sensing of said sound during travel through water; and separation means physically interconnecting the hydrophones in spaced relation to each other for establishing a time delay between said sensing of the sound by the respective hydrophones, equal to that of said aural perception of the sound traveling through air; the improvement residing in said separation means including: a hollow rod having opposite ends to which the hydrophones are fixed; and cable means protectively enclosed within the hollow rod and extending from the hydrophones for transmitting said signals to the detector means.

2. The improvement as defined in claim 1 further including: noise filtering means encasing said hydrophones for reduction in interference from noise generated by flow of the water adjacent to the hydrophones.

3. The improvement as defined in claim 2 including means for positioning the hollow rod with the hydrophones fixed thereto in alignment with speaker headphones associated with the audio output means on a user through whom said reduction in interference is effected through the noise filtering means by angular displacement of the hydrophones relative to an underwater origin of the sound.

4. The improvement as defined in claim 3, wherein said noise filtering means comprises domes respectively enclosing forward portions of the hydrophones facing said underwater original of the sound as a result of said angular displacement thereof, and acoustic baffles respectively connected to each of said domes and projecting aftward therefrom relative to underwater origin of the sound in enclosing relation to rearward portions of the hydrophones.

5. The improvement as defined in claim 1 including means for positioning the hollow rod with the hydrophones fixed thereto in alignment with speaker headphones associated with the audio output means.

* * * * *